(12) United States Patent
Cousineau et al.

(10) Patent No.: US 12,169,320 B2
(45) Date of Patent: Dec. 17, 2024

(54) OPTICAL FIBER SPLICE CLOSURE AND METHOD OF JOINING FIBER OPTIC CABLES

(71) Applicant: BCE INC., Verdun (CA)

(72) Inventors: Christian Cousineau, Sherrington (CA); Louis-Phillippe Potvin, Mount-Sainte Hilaire (CA); Michel Parent, La Prairie (CA)

(73) Assignee: BCE Inc., Verdun (CA)

( * ) Notice: Subject to any disclaimer, the term of this patent is extended or adjusted under 35 U.S.C. 154(b) by 0 days.

(21) Appl. No.: 17/781,023

(22) PCT Filed: Nov. 27, 2020

(86) PCT No.: PCT/CA2020/051631
§ 371 (c)(1),
(2) Date: May 30, 2022

(87) PCT Pub. No.: WO2021/102586
PCT Pub. Date: Jun. 3, 2021

(65) Prior Publication Data
US 2022/0413247 A1    Dec. 29, 2022

Related U.S. Application Data

(60) Provisional application No. 62/941,978, filed on Nov. 29, 2019.

(51) Int. Cl.
*G02B 6/38* (2006.01)
*G02B 6/44* (2006.01)
(Continued)

(52) U.S. Cl.
CPC ......... *G02B 6/4477* (2013.01); *G02B 6/3801* (2013.01); *G02B 6/3806* (2013.01);
(Continued)

(58) Field of Classification Search
CPC ........ G02B 6/25; G02B 6/255; G02B 6/2558; G02B 6/3801; G02B 6/3806;
(Continued)

(56) References Cited

U.S. PATENT DOCUMENTS 8,333,519 B2 * 12/2012 Marcouiller ......... G02B 6/2558
385/95

OTHER PUBLICATIONS

Extended European Search Report dated Nov. 24, 2023 from corresponding EP Patent Application No. 20894518.8.

* cited by examiner

*Primary Examiner* — Ryan A Lepisto
(74) *Attorney, Agent, or Firm* — Gowling WLG (Canada) LLP

(57) ABSTRACT

The present disclosure describes an optical fiber splice closure for joining two fiber optic cables. The optical fiber splice closure comprises a strain relief assembly that securely holds the two fiber optic cables being connected, and an enclosure that houses the strain relief assembly. The configuration of the strain relief assembly allows for securing the two fiber optic cables in a compact space, thus permitting a compact enclosure of the optical fiber splice closure, while also providing quick and easy installation in the field. A method of joining fiber optic cables using the optical fiber splice closure is also disclosed. The optical fiber splice closure and ease of joining also facilitates repairing damaged fiber optic cable. A method of repairing existing fiber optic cable is disclosed.

37 Claims, 15 Drawing Sheets

(51) Int. Cl.
  *G02B 6/25* (2006.01)
  *G02B 6/255* (2006.01)
(52) U.S. Cl.
  CPC ......... *G02B 6/4454* (2013.01); *G02B 6/4471* (2013.01); *G02B 6/44765* (2023.05); *G02B 6/44785* (2023.05); *G02B 6/25* (2013.01); *G02B 6/255* (2013.01); *G02B 6/2558* (2013.01)
(58) Field of Classification Search
  CPC ................ G02B 6/4454; G02B 6/4471; G02B 6/44765; G02B 6/4477; G02B 6/44785
  See application file for complete search history.

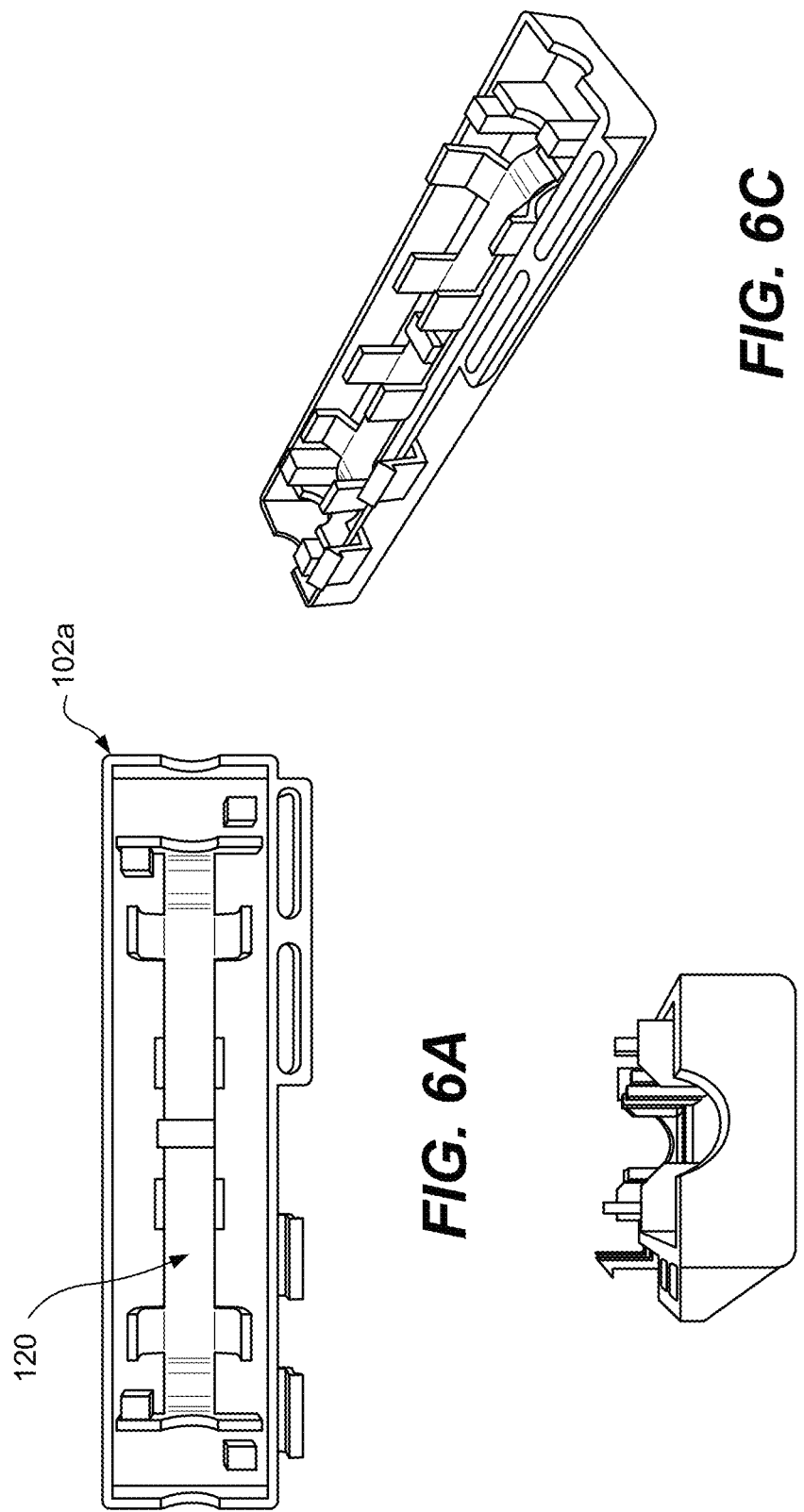

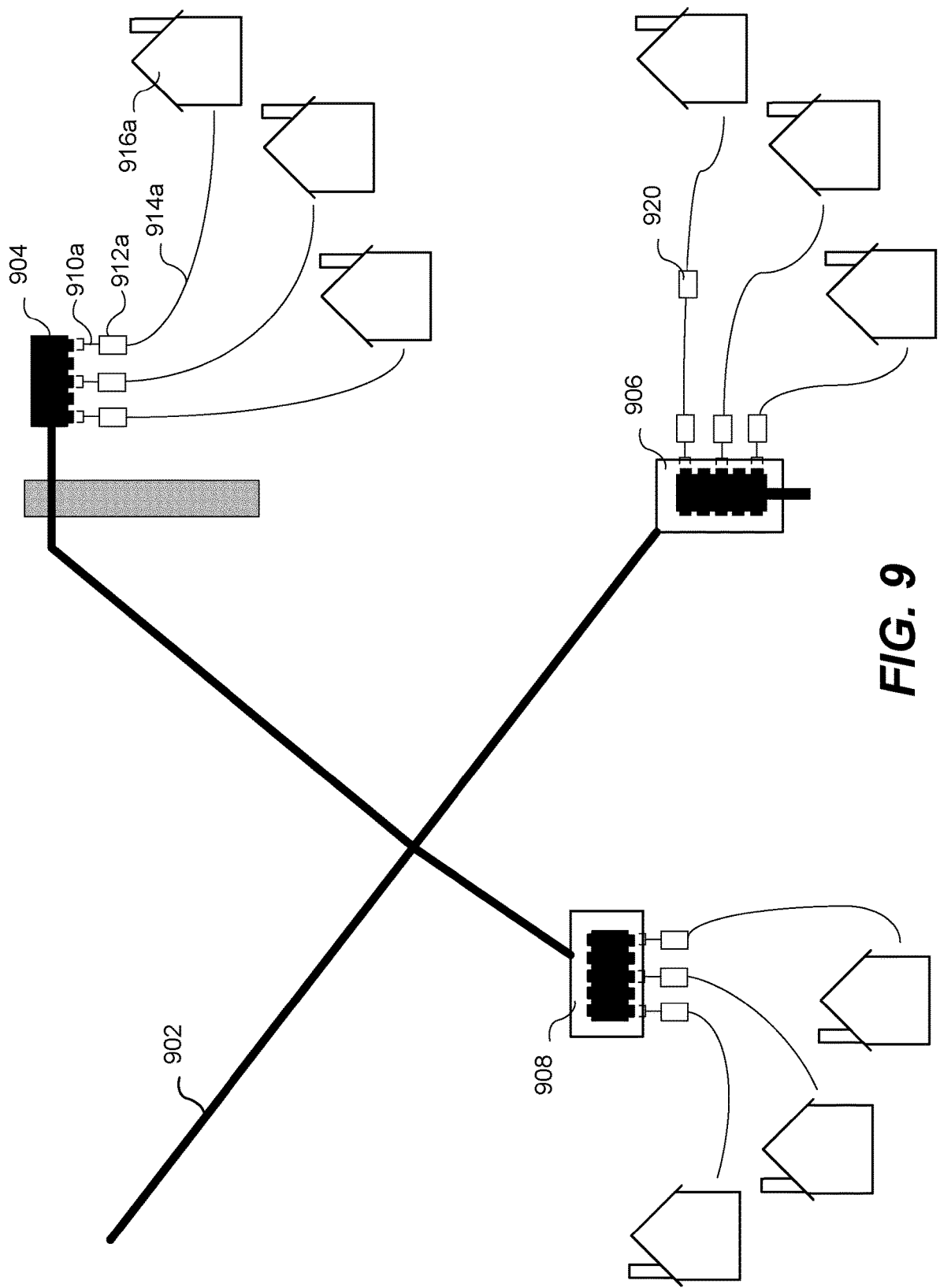

OPTICAL FIBER SPLICE CLOSURE AND METHOD OF JOINING FIBER OPTIC CABLES

CROSS-REFERENCE TO RELATED APPLICATIONS

This application claims priority to U.S. Provisional Patent Application No. 62/941,978, filed on Nov. 29, 2019, the entire contents of which are incorporated herein by reference.

TECHNICAL FIELD

The present disclosure relates to joining fiber optic cables, and in particular to an optical fiber splice closure for joining fiber optic cables and a method of joining fiber optic cables.

BACKGROUND

When deploying fiber to the home (FTTH) for telecommunications customers, fiber optic drop cable is provided on order from a terminal box of the telecommunications service provider to the customer's home. Current practice for installing the fiber optic drop cables requires a service technician traveling to the customer's home with various pre-defined lengths of pre-terminated drop cables (e.g. lengths ranging between 20 m to 300 m), determining the length of drop cable required, and cutting the drop cable to size or looping extra length in the terminal box or the customer's equipment. The drop cable is mechanically connected to the terminal box at one end, and to the customer's equipment (e.g. transition box or jack) at the other. The drop cable between the terminal box and the customer's home may be buried underground or traversed aerially.

Installing fiber optic drop cables as described above generally requires lots of space for the pre-defined lengths of drop cables (both at warehouses and in the service technician trucks), and also results in waste when cutting the drop cables to the required lengths. Terminating the fiber optic drop cable through fusion splicing is not performed because there is no way to terminate a bulk drop on the terminal side with a proper enclosure, and there is no way to build a reliable connector on-site. Furthermore, existing enclosures for housing fiber optic cable splice are too large, making them more cumbersome to bury underground, and if left above ground such as connected to a pole, may be undesirable to the public viewing.

Accordingly, optical fiber splice closures and methods of joining fiber optic cables remain desirable.

SUMMARY

In accordance with one aspect of the present disclosure, a strain relief assembly for securing first and second fiber optic cables is disclosed, each fiber optic cable comprising an optical fiber, a strength member, and an outer sheath enclosing the optical fiber and the strength member, the strain relief assembly comprising: a bracket; a first outer securing member coupled with the bracket for securing the outer sheath of the first fiber optic cable; a second outer securing member coupled with the bracket for securing the outer sheath of the second fiber optic cable; and at least one inner securing member coupled with the bracket for securing the strength members of the first and second fiber optic cables along lengths thereof where the outer sheaths have been removed; wherein the at least one inner securing member is arranged closer to a center along a longitudinal length of the bracket than the first and second outer securing members.

In some aspects of the strain relief assembly, the at least one inner securing member comprises first and second inner securing members along the longitudinal length of the bracket.

In some aspects of the strain relief assembly, one or more of the securing members comprises a pair of securing members.

In some aspects of the strain relief assembly, one or more of the securing members are configured to be folded or crimped to secure the respective outer sheath or strength members.

In some aspects of the strain relief assembly, the bracket further comprises first and second support members for supporting the first and second fiber optic cables.

In some aspects of the strain relief assembly, the bracket comprises a depression between the respective first and second support members and a length of the bracket along which the securing members are arranged, and wherein the depression has a bottom surface that is disposed lower than the length of the bracket along which the securing members are arranged when viewed from the side.

In some aspects of the strain relief assembly, the bracket further comprises a ridge for securing the strength members in conjunction with the at least one inner securing member.

In some aspects of the strain relief assembly, the ridge is formed from a ridge-forming member coupled with the bracket.

In some aspects of the strain relief assembly, the ridge is disposed at the center of the bracket.

In some aspects of the strain relief assembly, the at least one inner securing member comprises first and second inner securing members disposed at respective sides of the ridge.

In some aspects of the strain relief assembly, the bracket is made of metal.

In some aspects of the strain relief assembly, the strength member of at least one of the first and second fiber optic cables comprises a strengthening rod.

In some aspects of the strain relief assembly, the strength member of at least one of the first and second fiber optic cables comprises a strengthening fiber.

In some aspects of the strain relief assembly, at least one of the first and second fiber optic cables comprise a plurality of strength members.

In some aspects of the strain relief assembly, the plurality of strength members comprise two or more strengthening rods.

In some aspects of the strain relief assembly, the plurality of strength members comprise a strengthening fiber and at least one strengthening rod.

In accordance with another aspect of the present disclosure, an optical fiber splice closure for joining first and second fiber optic cables is disclosed, each fiber optic cable comprising an optical fiber, a strength member, and an outer sheath enclosing the optical fiber and the strength member, the optical fiber splice closure comprising: an enclosure having a base portion and a top portion connectable with each other, the base portion and the top portion when connected configured to define first and second openings for first and second fiber optic cables, respectively; and a strain relief assembly disposed inside of the enclosure, comprising: a bracket; a first outer securing member coupled with the bracket for securing the outer sheath of the first fiber optic cable; a second outer securing member coupled with the bracket for securing the outer sheath of the second fiber optic cable; and at least one inner securing member coupled with the bracket for securing the strength members of the first and second fiber optic cables along lengths thereof where the outer sheaths have been removed; wherein the at least one inner securing member is arranged closer to a center along a longitudinal length of the bracket than the first and second outer securing members.

In accordance with some aspects of the optical fiber splice closure, the at least one inner securing member comprises first and second inner securing members along the longitudinal length of the bracket.

In accordance with some aspects of the optical fiber splice closure, one or more of the securing members comprises a pair of securing members.

In accordance with some aspects of the optical fiber splice closure, one or more of the securing members are configured to be folded or crimped to secure the respective outer sheath or strength member.

In accordance with some aspects of the optical fiber splice closure, the bracket further comprises first and second support members for supporting the first and second fiber optic cables.

In accordance with some aspects of the optical fiber splice closure, the bracket comprises a depression between respective first and second support members and a length of the bracket along which the securing members are arranged, and wherein the depression has a bottom surface that is disposed lower than the length of the bracket along which the securing members are arranged when viewed from the side.

In accordance with some aspects of the optical fiber splice closure, the bracket further comprises a ridge for securing the strength members in conjunction with the at least one inner securing member.

In accordance with some aspects of the optical fiber splice closure, the ridge is formed from a ridge-forming member coupled with the bracket.

In accordance with some aspects of the optical fiber splice closure, the ridge is disposed at the center of the bracket.

In accordance with some aspects of the optical fiber splice closure, the at least one inner securing member comprises first and second inner securing members disposed at respective sides of the ridge.

In accordance with some aspects of the optical fiber splice closure, the strength member of at least one of the first and second fiber optic cables comprises a strengthening rod.

In accordance with some aspects of the optical fiber splice closure, the strength member of at least one of the first and second fiber optic cables comprises a strengthening fiber.

In accordance with some aspects of the optical fiber splice closure, at least one of the first and second fiber optic cables comprise a plurality of strength members.

In accordance with some aspects of the optical fiber splice closure, the plurality of strength members comprise two or more strengthening rods.

In accordance with some aspects of the optical fiber splice closure, the plurality of strength members comprise a strengthening fiber and at least one strengthening rod.

In accordance with some aspects of the optical fiber splice closure, the enclosure comprises a flooding compound disposed in an interior thereof.

In accordance with some aspects of the optical fiber splice closure, the strain relief assembly is made of metal.

In accordance with some aspects of the optical fiber splice closure, the top and bottom portions of the enclosure are made of LDPE or MDPE UV protected plastic.

In accordance with still another aspect of the present disclosure, a method of joining fiber optic cables in the optical fiber splice closure of any of the above aspects is disclosed, the method comprising: removing the outer sheaths at ends of the first and second fiber optic cables to be connected to expose the respective strength members and the optical fibers; securing the outer sheaths of the first and second fiber optic cables with the respective first and second outer securing members, and securing the strength members of the first and second fiber optic cables with the at least one inner securing member; splicing the optical fibers of the first and second fiber optic cables; placing the strain relief assembly into the enclosure; and closing the enclosure by connecting the top and bottom portions thereof.

In accordance with some aspects of the method, splicing the optical fibers comprises fusing the optical fibers.

In some aspects the method further comprises placing heatshrink over the fused optical fibers.

In accordance with some aspects of the method, splicing the optical fibers comprises mechanically splicing the optical fibers.

In some aspects the method further comprises filling the enclosure with flooding compound.

In accordance with some aspects of the method, the first fiber optic cable is fiber optic drop cable extending between a terminal box and a customer premise, and the second fiber optic cable comprises a pig-tail connector connected to the terminal box.

In accordance with still another aspect of the present disclosure, a method of repairing existing fiber optic cable is disclosed, comprising: cutting the existing fiber optic cable to remove a length of damaged portion, the existing fiber optic cable with the length of damaged portion removed having first and second exposed end portions; cutting a length of new fiber optic cable corresponding to the length of damaged portion of the existing fiber optic cable, the length of new fiber optic cable having first and second exposed end portions; joining the first exposed end portions of the existing fiber optic cable and the new fiber optic cable in a first optical fiber splice closure in accordance with the method of joining fiber optic cables of any of the above aspects; and joining the second exposed end portions of the existing fiber optic cable and the new fiber optic cable in a second optical fiber splice closure in accordance with the method of joining fiber optic cables of any of the above aspects.

In accordance with still another aspect of the present disclosure, an optical fiber splice closure kit is disclosed, comprising: the strain relief assembly of any of the above aspects; and an enclosure having a base portion and a top portion connectable with each other, the base portion and the top portion when connected configured to define first and second openings for first and second fiber optic cables, respectively.

In some aspects, the optical fiber splice closure kit further comprises a flooding compound.

In some aspects, the optical fiber splice closure kit further comprises a pigtail connector for connection with a terminal box.

BRIEF DESCRIPTION OF THE DRAWINGS

Further features and advantages of the present disclosure will become apparent from the following detailed description, taken in combination with the appended drawings, in which:

FIGS. 6A-F show an example of a constructed optical fiber splice closure;

FIG. 9 shows an example representation of optical fiber splice closures installed in the field.

It will be noted that throughout the appended drawings, like features are identified by like reference numerals.

DETAILED DESCRIPTION

Figure 1:
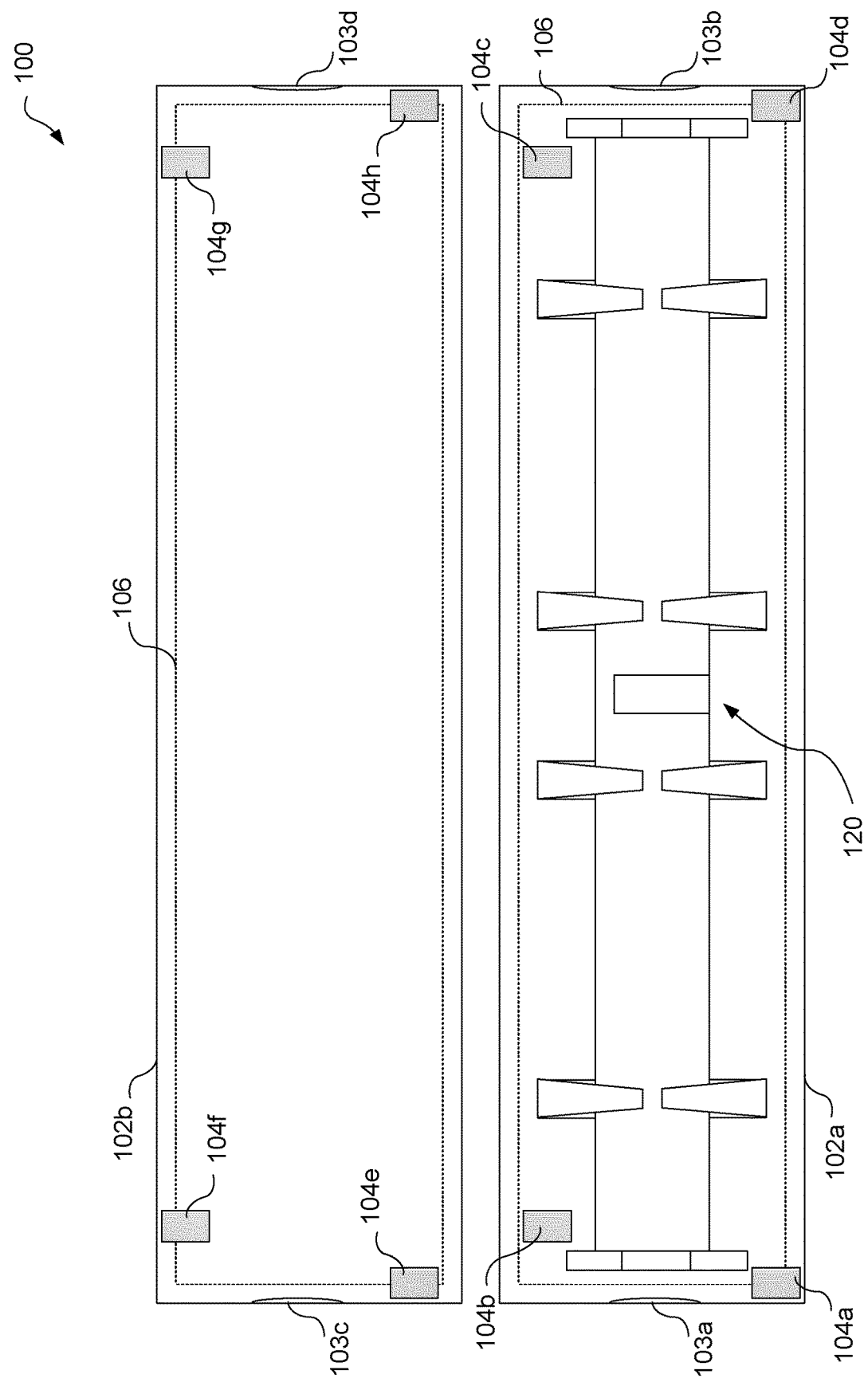
FIG. 1 shows a representation of an optical fiber splice closure in accordance with some aspects of the present disclosure.

The present disclosure describes an optical fiber splice closure for joining two fiber optic cables. One particular application of the optical fiber splice closure contemplated herein is for use in bulk fiber drop when providing fiber to the home (FTTH), where the fiber optic drop cable is provided on a reel that service technicians can drive to the installation site and cut to length. One end of the fiber optic drop cable can be joined with a small length of fiber optic cable having any kind of pig-tail connector for connection to the terminal box, while the other end of the fiber optic drop cable can be joined to the customer premise. Accordingly, carrying multiple lengths of pre-terminated drops is no longer required. When providing FTTH, the optical fiber splice closure can be used with any kind of pig-tail connectors as long as the same type of optical fiber is present, allowing for more flexibility in installation. More generally, the optical fiber splice closure can be used for joining any two fiber optic cables, including different types of fiber optic cables, provided that they are sized appropriately and that the same type of optical fiber is present. The optical fiber splice closure as disclosed herein securely encloses the spliced optical fibers and holds the fiber optic cables while also providing a damage- and weather-resistant enclosure. The optical fiber splice closure may be particularly advantageous in that it allows for splicing of the optical fibers housed within a relatively small enclosure which facilitates stacking, is hardly noticeable by the public, and can be easily buried underground.

The optical fiber splice closure comprises a strain relief assembly with a plurality of securing members that securely holds the two fiber optic cables being joined, and an enclosure that houses the strain relief assembly. The configuration of the strain relief assembly is configured to allow for securing the two fiber optic cables in a compact space, thus permitting a compact enclosure of the optical fiber splice closure, while also providing quick and easy installation in the field. The optical fiber splice closure comprising the strain relief assembly and the enclosure may be provided as part of kit, which may further include various other components for joining and/or installation of the fiber optic cables.

A method of joining fiber optic cables using the optical fiber splice closure is also disclosed. The optical fiber splice closure and ease of joining also facilitates repairing damaged fiber optic cable. A method of repairing existing fiber optic cable is disclosed.

While reference in the description is particularly made with regards to fiber optic drop cables for use in providing FTTH, it will be appreciated by a person skilled in the art that the optical fiber splice closure and methods disclosed herein are not limited to use in drop cable and may also be used more generally for joining any two fiber optic cables in various fiber installation or repair applications.

Embodiments are described below, by way of example only, with reference to FIGS. 1-10.

FIG. 1 shows a representation of an optical fiber splice closure in accordance with some aspects of the present disclosure. The optical fiber splice closure 100 is configured for joining two fiber optic cables. The optical fiber splice closure 100 comprises an enclosure having a base portion 102a and a top portion 102b that are able to be connected together to house spliced fiber optic cable. The base portion 102a and/or the top portion 102b may comprise cut-outs at ends thereof that are sized appropriately for the fiber optic cables so that when the base portion 102a and the top portion 102b are connected together the cut-outs define openings in the enclosure for the fiber optic cables to extend outward from the enclosure. In FIG. 1, each of the bottom portion 102a and top portion 102b have cut-outs on respective ends thereof, shown as cut-outs 103a-d. The base portion 102a and the top portion 102b may form two halves of the enclosure or alternatively one of the base portion 102a and the top portion 102b may be larger than the other. The base portion 102a and the top portion 102b may be coupled via hinges (not shown) or may be separate elements. The base portion 102a and the top portion 102b may be securely connected by way of a mechanical connection, a locking mechanism, etc. The base portion 102a and the top portion 102b may be made of low density polyethylene (LDPE) or medium density polyethylene (MDPE) UV protected plastic.

The optical fiber splice closure 100 further comprises a strain relief assembly 120 disposed inside of the enclosure (in FIG. 1, the strain relief assembly 120 is disposed in the base portion 102a) for securing the two fiber optic cables. The configuration of the strain relief assembly 120 is described in more detail with reference to FIGS. 2 and 3. The base portion 102a and the top portion 102b may each also comprise one or more pins (pins 104a-d for the base portion 102a and pins 104e-h for the top portion 102b), which help to prevent the strain relief assembly 120 from moving within the enclosure. The enclosure may also comprise a flooding compound 106 provided in an interior thereof to protect the cable splices, particularly when used in outdoor (e.g. "wet") applications. In indoor (e.g. "dry") applications, for example to join two fiber optic cables for extending a length of optical fiber running inside a house, flooding compound 106 may not be required. For the sake of example only, the flooding compound 106 may be POLY-BEE™ sealant. The base portion 102a and/or the top portion 102b may be partially filled with the flooding compound, and after insertion of the strain relief assembly 120 and splicing of the optical fibers the enclosure may be completely filled with the flooding compound such that there are no voids remaining in the enclosure. Alternatively, there may be no flooding compound in the enclosure prior to splicing, and the enclosure is completely filled with the flooding compound after insertion of the strain relief assembly 120 and splicing of the optical fibers. As described in more detail with respect to FIGS. 2 and 3, the compact design of the strain relief assembly also helps to facilitate filling the enclosure with the sealant without voids.

Figure 2A:
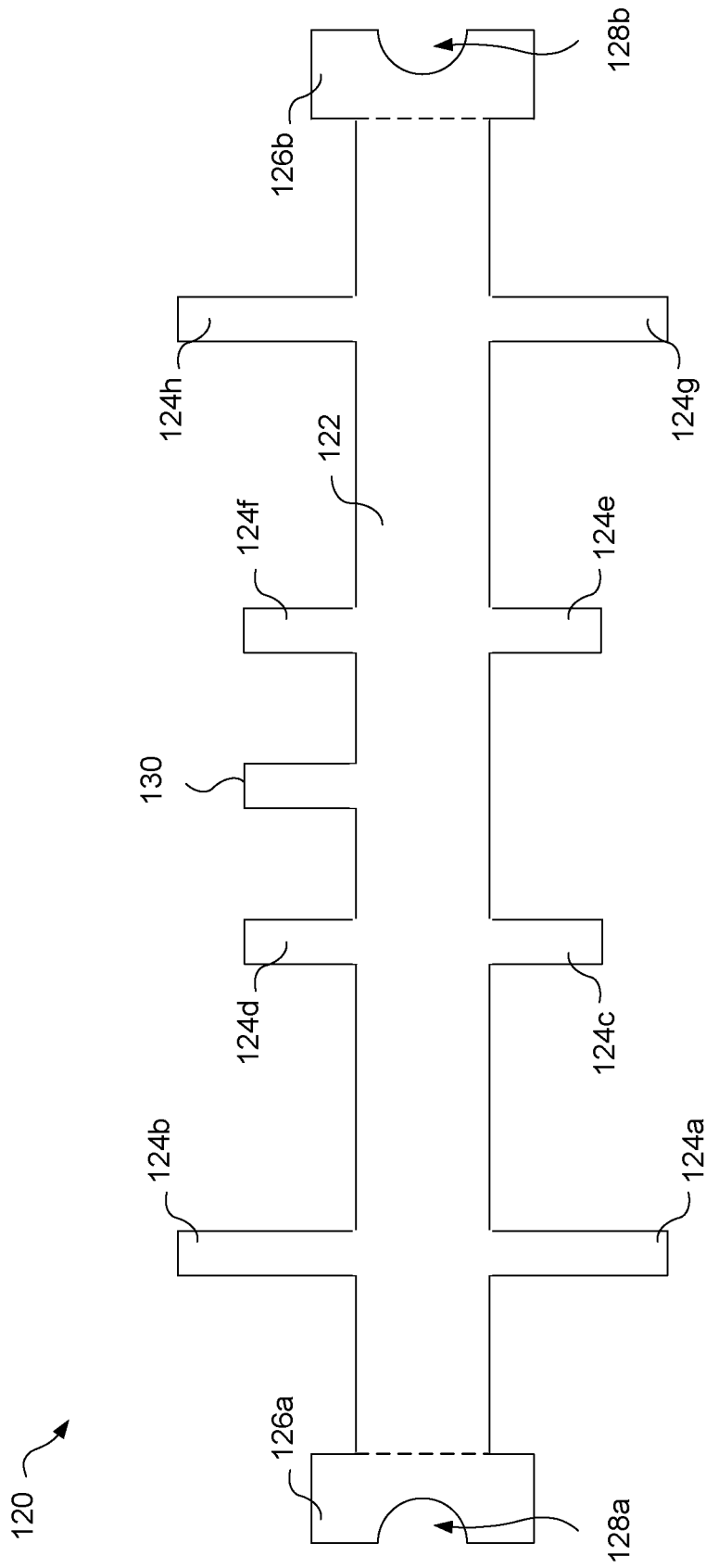
FIGS. 2A-E show a representation of a strain relief assembly of the optical fiber splice closure.
Figure 2B:
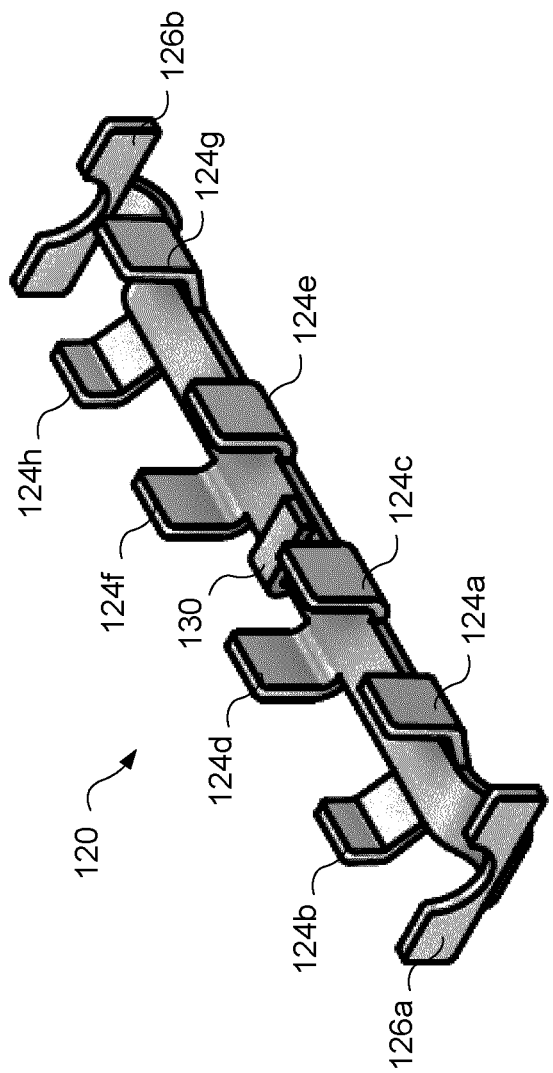
Figure 2D:
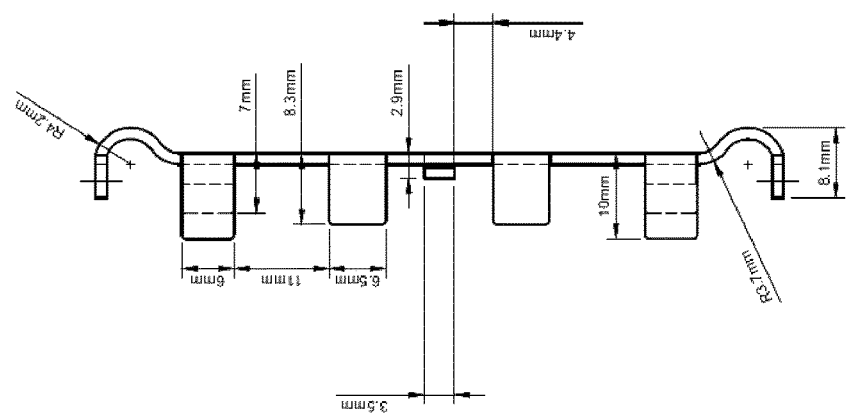
Figure 2C:
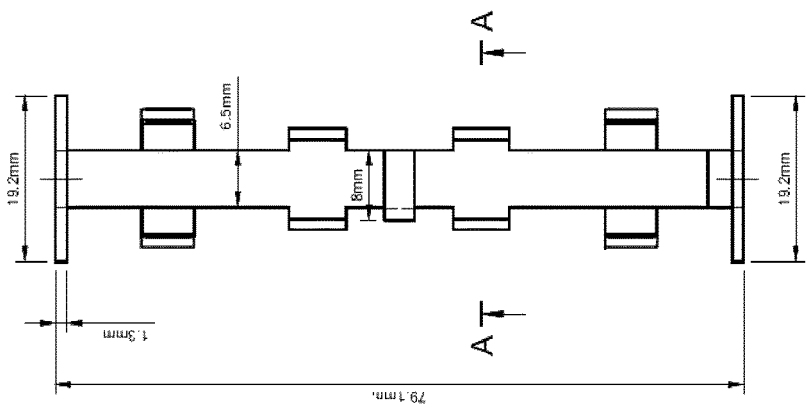
Figure 2E:
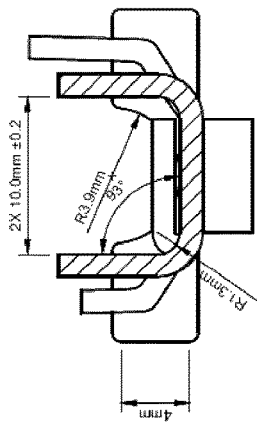

FIGS. 2A-E (collectively referred to as FIG. 2) show a representation of the strain relief assembly of the optical fiber splice closure. The strain relief assembly 120 as shown in FIG. 2A is shown in a pre-formed state, whereas FIG. 2B shows a rendered image of the strain relief assembly 120 after forming. FIGS. 2C-E provide non-limiting dimensions of the strain relief assembly for the sake of example only; actual dimensions may vary without departing from the scope of this disclosure, which may for example depend on the size and/or configuration of the fiber optic cables to be joined/installed. In general, however, the strain relief assembly 120 is compact to allow for a compact enclosure.

The strain relief assembly 120 comprises a bracket 122 and a plurality of securing members disposed along a longitudinal length of the bracket 122. The bracket 122 may have a rough finish to prevent slippage of the fiber optic cables being joined. The strain relief assembly comprises at least first and second outer securing members and at least one inner securing member, wherein the at least one inner securing member is arranged closer to a center along a longitudinal length of the bracket than the first and second outer securing members. The strain relief assembly 120 shown in FIG. 2 comprises four pairs of securing members, namely securing members 124a-b, 124c-d, 124e-f, and 124g-h. The securing members 124a-b and 124g-h are outer securing members, and the securing members 124c-d and 124e-f are inner securing members. It would also be appreciated that instead of pairs of securing members, only one securing member of each pair may be provided (for example, securing members 124a, 124c, 124e, and 124g). The strain relief assembly 120 comprising the bracket 122 and the securing members 124a-h may be formed from a single piece of material such as metal. The securing members may be pliable tabs that can folded or crimped to form structures similar to those shown in FIG. 1. For instance, the bracket 122 and the securing members 124a-h may be made of aluminum or another type of soft metal that is able to be crimped without cracking. Use of pliable tabs as securing members that can be crimped or folded may be particularly advantageous in that it is easy to secure the fiber optic cable and also that the tabs can secure various types of fiber optic cables (i.e. different shapes/configurations, thickness, etc.) because they are crimped around the fiber optic cable and its components. The crimping of pliable tabs to secure the fiber optic cables also facilitates easy installation in the field as no specialized tools are required. Other types of securing members may also be used, for example, screw-type clamps, hose clamps, etc., though these may necessitate larger optical fiber splice closures. As depicted in FIG. 2, the securing members 124a-h may have different configurations/sizes. The securing members 124a-h may be sized appropriately for the fiber optic cables being secured.

The strain relief assembly 120 may further comprise one or more support members for supporting the fiber optic cables. In FIG. 2, first and second support members 126a and 126b are provided at respective ends of the bracket 122. The support members 126a and 126b comprise a recess 128a and 128b sized for receiving the fiber optic cable. The first and second support members 126a and 126b may also be formed from a single piece of material with the bracket 122 and the securing members 124a-h, and from the pre-formed state, the first and second support members 126a and 126b may be folded or crimped inwards toward a center along a longitudinal axis of the bracket 122. As best seen in FIGS. 2B and 2D, the first and second support members 126a and 126b may be folded or crimped inwards so as to form a depression in the bracket 122 having a bottom surface that is disposed lower than a length of the bracket along which the securing members 124a-h are arranged when viewed from the side (i.e. elevation view). For example, in FIG. 2D the depression is shown as having a radius of curvature of 4.2 mm (though again, is not limited to such dimension). Forming this depression in the bracket helps to create a space between the strain relief assembly 120 and the enclosure, which ensures that the flooding compound can be filled entirely around the strain relief assembly 120 without voids.

The strain relief assembly 120 may further comprise a ridge-forming member 130 close to the center of the bracket 122. As shown in FIGS. 2B and 2C and described further with reference to FIG. 3, the ridge-forming member 130 may be folded or crimped to form a ridge along the bracket 122. The ridge-forming member 130 may be similar to the securing members 124a-h. Alternatively, a ridge may be imparted in the bracket 122 using other means, such as mechanical deformation of the bracket 122 itself.

Figure 3A:
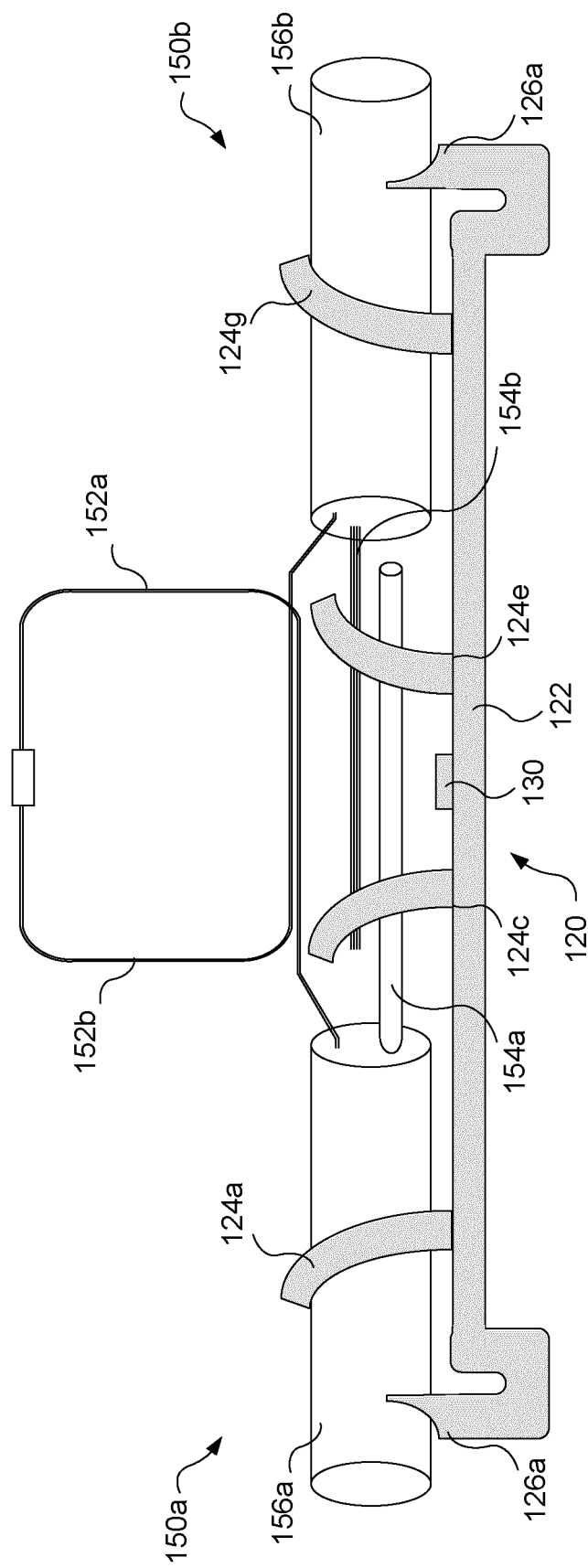
FIGS. 3A-C show a representation of fiber optic cables secured by the strain relief assembly.
Figure 3C:
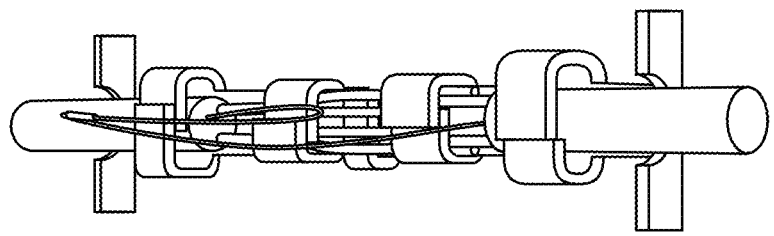
Figure 3B:
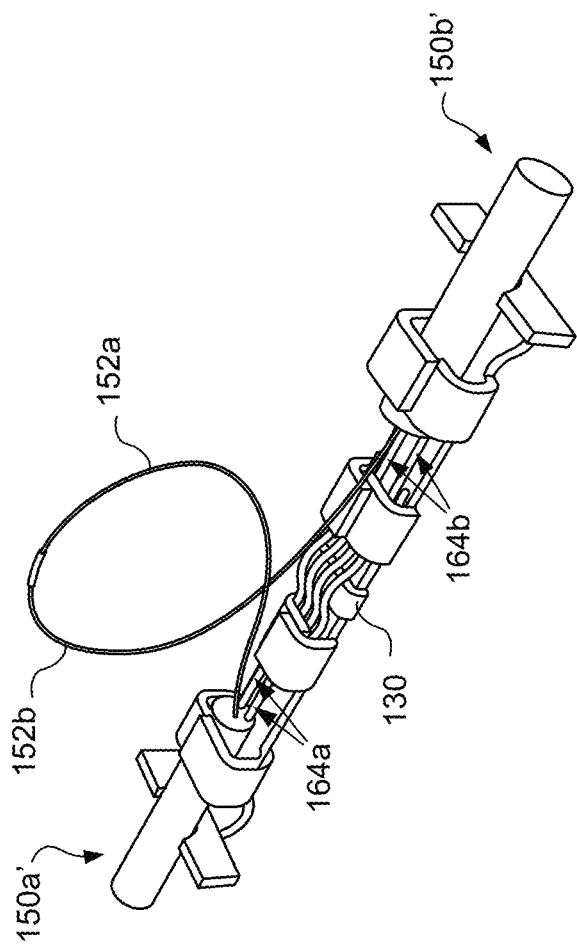

FIGS. 3A-C (collectively referred to as FIG. 3) show a representation of fiber optic cables secured by the strain relief assembly. FIG. 3A shows an elevation view of fiber optic cables secured by the strain relief assembly according to a first example, and FIGS. 3B and 3C respectively show a rendered perspective view and a rendered plan view of fiber optic cables secured by the strain relief assembly according to a second example.

The strain relief assembly 120 is configured to secure two fiber optic cables 150a and 150b. Each of the fiber optic cables 150a and 150b respectively comprise an optical fiber 152a and 152b, at least one strength member, and an outer sheath 156a and 156b that encloses the optical fibers and the strength member(s). As shown in FIG. 3, the outer sheath 156a and 156b has been removed from a length of the fiber optic cable at ends thereof for joining the optical fibers and for securing the fiber optic cables in the strain relief assembly 120. The fiber optic cables 150a and 150b may have various external configurations such as flat drop cable, round drop cable, etc. The fiber optic cables 150a and 150b may further have various internal configurations. As one example, the fiber optic cables may comprise one or more strengthening rods disposed in the outer sheath that constitute strength members. The strengthening rods may be made of glass-reinforced plastic, for example. Alternatively or additionally, the fiber optic cables may comprise a subunit structure such as a jacket encompassing the optical fiber and strengthening fibers that also constitute strength members. The jacket may for example be flame-retardant. The strengthening fibers may for example comprise a fiber material such as aramid yarn. Alternatively, there may be no subunit structure, and the optical fiber may be disposed directly in the sheathing, and/or disposed in the sheathing surrounded by strengthening fibers (but not necessarily a jacket as part of a subunit structure). A person skilled in the art will readily appreciate that the fiber optic cables may comprise any one or a combination of these internal configurations. For example, a fiber optic cable may comprise one or more strengthening rods disposed in the outer sheath as well as a subunit structure with strengthening fibers disposed therein. As another example, a fiber optic cable may comprise one or more strengthening rods disposed in the outer sheath and the optical fiber disposed directly in the sheathing. As still a further example, a fiber optic cable may comprise no strengthening rods, and the strength member is constituted only by the strengthening fibers surrounding the optical fiber. This configuration of fiber optic cable with no strengthening rods may be particularly useful if the fiber optic cable is to undergo significant bending. Examples of fiber optic drop cables in industry include SST-Drop™, ROC™ Drop, Jettable Round Drop (JRD)™, and ClearCurve™ Compact Drop, each from Corning™. In each of the above-described internal configurations, the fiber optic cable comprises at least one strength member that improves the overall strength of the fiber optic cable (e.g. tensile strength). It will also be appreciated that other types of strength members than strengthening rods and strengthening fibers may be present without departing from the scope of this disclosure. In FIG. 3A, fiber optic cable 150a is shown as comprising a strengthening rod 154a and fiber optic cable 150b is shown as comprising strengthening fibers 154b. In FIG. 3B, fiber optic cables 150a' and 150b' are respectively shown as comprising two strengthening rods 164a and 164b each.

As seen in FIG. 3A, the fiber optic cables 150a and 150b are respectively supported by the first and second support members 126a and 126b. The two outermost securing members along the longitudinal length of the bracket 122, i.e. securing members 124a and 124g in FIG. 3A, are configured for securing the outer sheaths 156a and 156b of the respective fiber optic cables 150a and 150b. Securing the outer sheaths 156a and 156b with the securing members 124a and 124g also helps for positioning the fiber optic cables 150a and 150b on the strain relief assembly 120. With the fiber optic cables 150a and 150b placed on the strain relief assembly 120, the securing members 124a and 124g may be folded or crimped to secure the outer sheaths 156a and 156b.

The inner securing members 124c and 124e, which are arranged closer to a center of the bracket along the longitudinal length of the bracket 122, are configured for securing the strength members of the fiber optic cables 150a and 150b (i.e. strengthening rod 154a of fiber optic cable 150a and strengthening fibers 154b of fiber optic cable 150b). Securing the strength members with the securing members 124c and 124e restricts movement of the fiber optic cables 150a and 150b and prevents the fiber optic cables from being pulled out from the strain relief assembly after the optical fibers have been joined. If there is more than one strength member per fiber optic cable, each of the strength members may be secured by the inner securing members, or only some of strength members may be secured by the inner securing members. As one example, if a fiber optic cable comprises a plurality of strength members including a strengthening rod(s) and strengthening fiber, a sufficient tensile strength to prevent slippage of the fiber optic cable from the strain relief assembly may be obtained by only securing the strengthening rod(s) with the securing members, and the strengthening fibers may be cut/discarded and not secured by the securing members. Each of the securing members 124c and 124e may secure the strength members from both of the fiber optic cables in order to further prevent the fiber optic cables from sliding out from the enclosure. In an alternative embodiment, there may only be one inner securing member disposed near a center of the bracket 122 and securing both strength members 154a and 154b (i.e. one of the securing members 124c and 124e may be omitted). With the fiber optic cables 150a and 150b placed on the strain relief assembly, the securing members 124c and 124e may be folded or crimped to secure the strength members. The strength members are further secured by the securing members 124c and 124e when pressed against the ridge formed from the ridge-forming member 130 (as best shown in FIG. 3B). The ridge is formed between the securing members 124c and 124e, and the securing members 124c and 124e may be folded or crimped to secure the strength members in contact with the ridge.

The securing members of the strain relief assembly 120 thus position and securely hold the fiber optic cables 150a and 150b being connected. While FIG. 3A depicts four securing members 124a, 124c, 124e, and 124g for securing the respective outer sheaths 156a-b and strength members 154a-b, the strain relief assembly 120 may comprise pairs of securing members as shown in FIGS. 2 and 3B-C. Additionally, instead of two pairs of inner securing members for holding the strength members, there may only be a single securing member or a single pair of securing members to hold the strength members.

The optical fibers 152a and 152b may be diverted external to the securing members to avoid being clamped or restrained. The optical fibers are spliced. In general, fusion splicing may be performed to ensure high quality splicing and minimize maintenance work, particularly as the optical fiber splice closure 100 may be buried underground when providing FTTH, however the optical fibers may also be mechanically spliced within the optical fiber splice closure 100.

Figure 4:
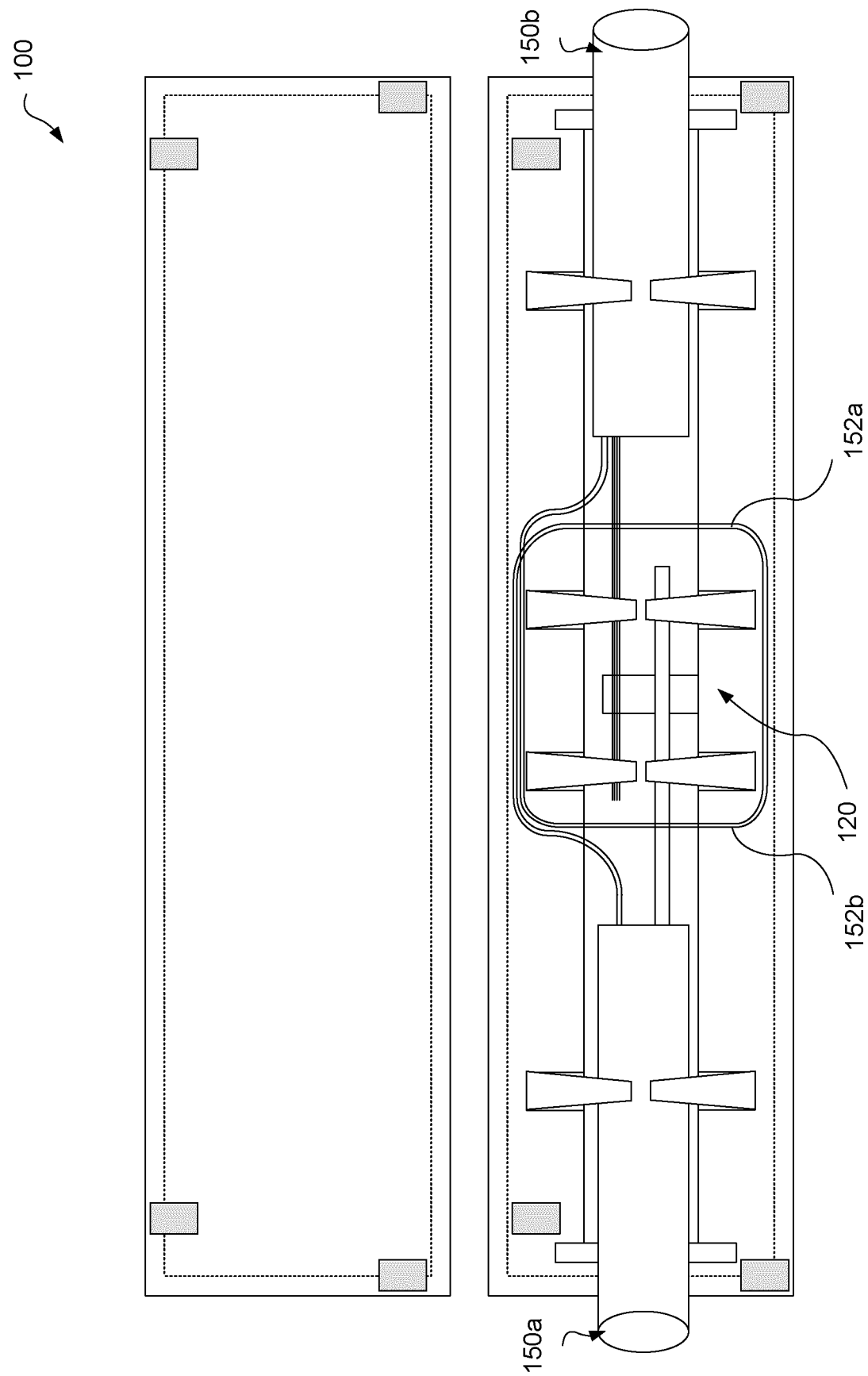
FIG. 4 shows a representation of the fiber optic cables joined in the optical fiber splice closure of FIG. 1.

FIG. 4 shows a representation of the fiber optic cables joined in the optical fiber splice closure 100 of FIG. 1. The strain relief assembly 120 is securing the fiber optic cables 150a and 150b, as described with reference to FIG. 3A. Reference numerals for the elements of the optical fiber splice closure 100 and the fiber optic cables 150a and 150b are omitted from FIG. 4 for the sake of clarity, except where referred to.

As depicted in FIG. 4, the optical fibers 152a and 152b of the fiber optic cables 150a and 150b have been spliced. FIG. 4 depicts a case where the optical fibers 152a and 152b are fused. To perform the fusion splicing, excess optical fiber is exposed, which may be coiled and secured within the enclosure. In this regard, the optical fiber should be a bend-insensitive fiber if it is being coiled/curved. One non-limiting example of a bend-insensitive fiber is ITU-T G.657 bend-insensitive single-mode fibers. Bend-insensitive fibers that allow for a smaller bending radii, such as G.657.B3, may in particular be useful to keep the size of the enclosure small, however bend-insensitive fibers with larger bending radii, such as G.657.A1/A2/B2 may be used as well and the enclosure may be sized to accommodate such fibers. The excess length of optical fiber may be secured by setting in the flooding compound in cases where the enclosure is filled with the flooding compound.

Figure 5A:
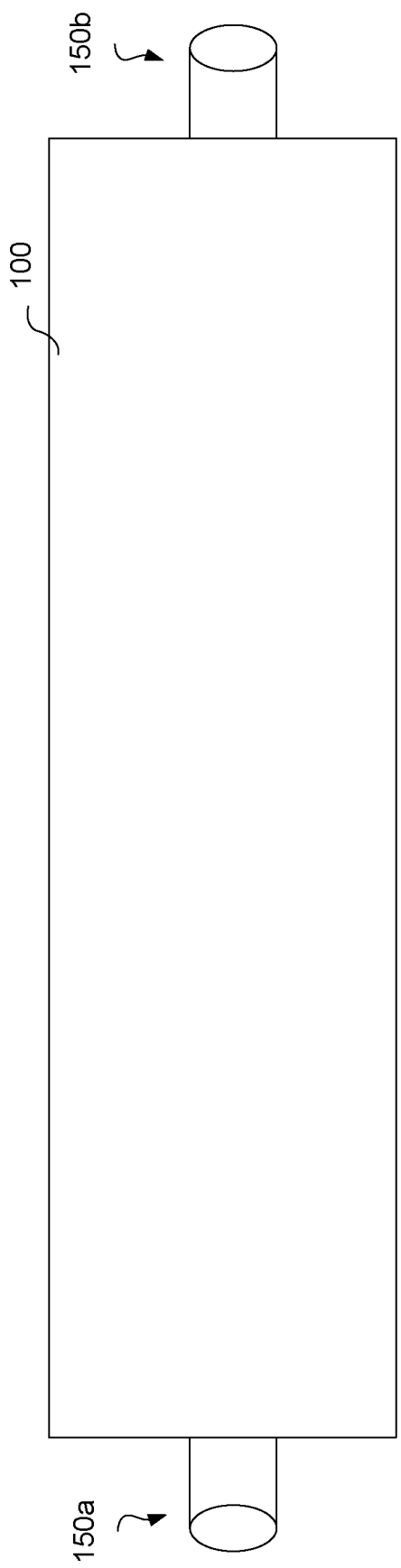
FIGS. 5A and 5B respectively show a plan view and an elevation view of a completed assembly of the optical fiber splice closure with the fiber optic cables joined therein.
Figure 5B:
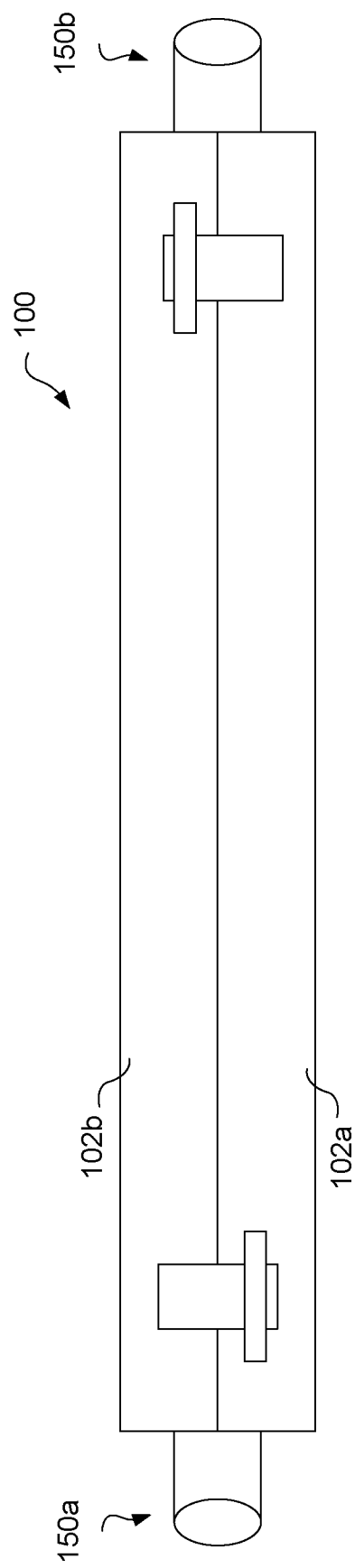

FIGS. 5A and 5B respectively show a plan view and an elevation view of a completed assembly of the optical fiber splice closure 100 with the fiber optic cables 150a and 150b joined therein. The base portion 102a and the top portion 102b are connected together to enclose the strain relief assembly and the spliced optical fiber. The base portion 102a and the top portion 102b may be secured to one another through various means, such as mechanical connection via mating grooves, bolts, etc., or locking mechanisms such as a latch. The fiber optic cables 150a and 150b extend from the optical fiber splice closure 100 through openings defined by the cut-out portions of the base portion 102a and/or the top portion 102b.

As depicted in FIGS. 5A and 5B the surfaces of the optical fiber splice closure enclosure may be substantially flat to facilitate stacking several optical fiber splice closures together. The optical fiber splice closure 100 as assembled is relatively small and compact, and may for example have dimensions on the order of approximately 1" width, 4" length, and 0.5" height, though actual dimensions may vary.

Figure 6D:
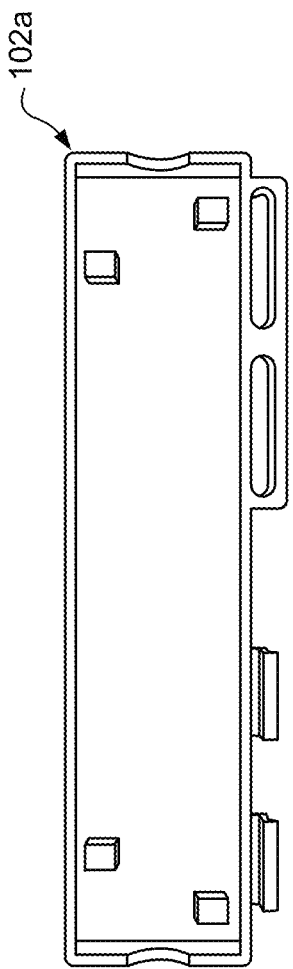
Figure 6E:
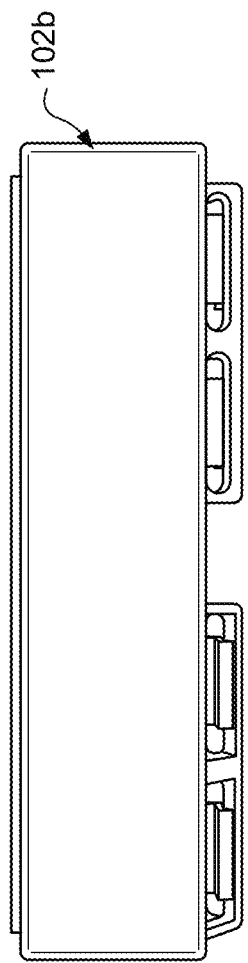
Figure 6F:
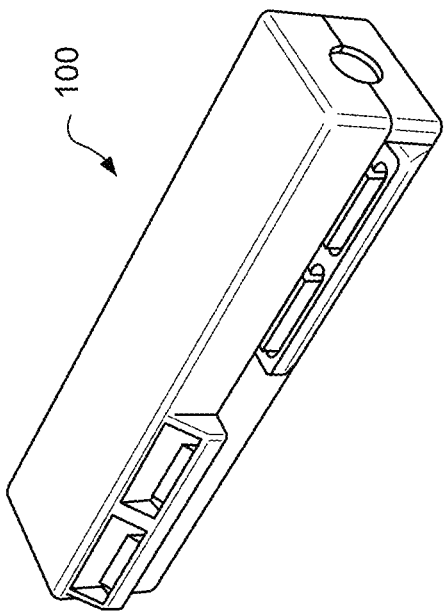

FIGS. 6A-F show an example of a constructed optical fiber splice closure. FIG. 6A shows a plan view of the strain relief assembly 120 disposed in the bottom portion 102*a* of the enclosure. FIG. 6B shows a side elevation view with the strain relief assembly 120 disposed in the bottom portion 102*a* of the enclosure. FIG. 6C shows a perspective view of the strain relief assembly 120 disposed in the bottom portion 102*a* of the enclosure. FIG. 6D shows a plan view of the bottom portion 102*a* of the enclosure without the strain relief assembly disposed therein. FIG. 6E shows a plan view of the optical fiber splice closure 100 with the top portion 102*b* coupled with the bottom portion 102*a* of the enclosure. FIG. 6F shows a perspective view of an assembled optical fiber splice closure 100.

Figure 7:
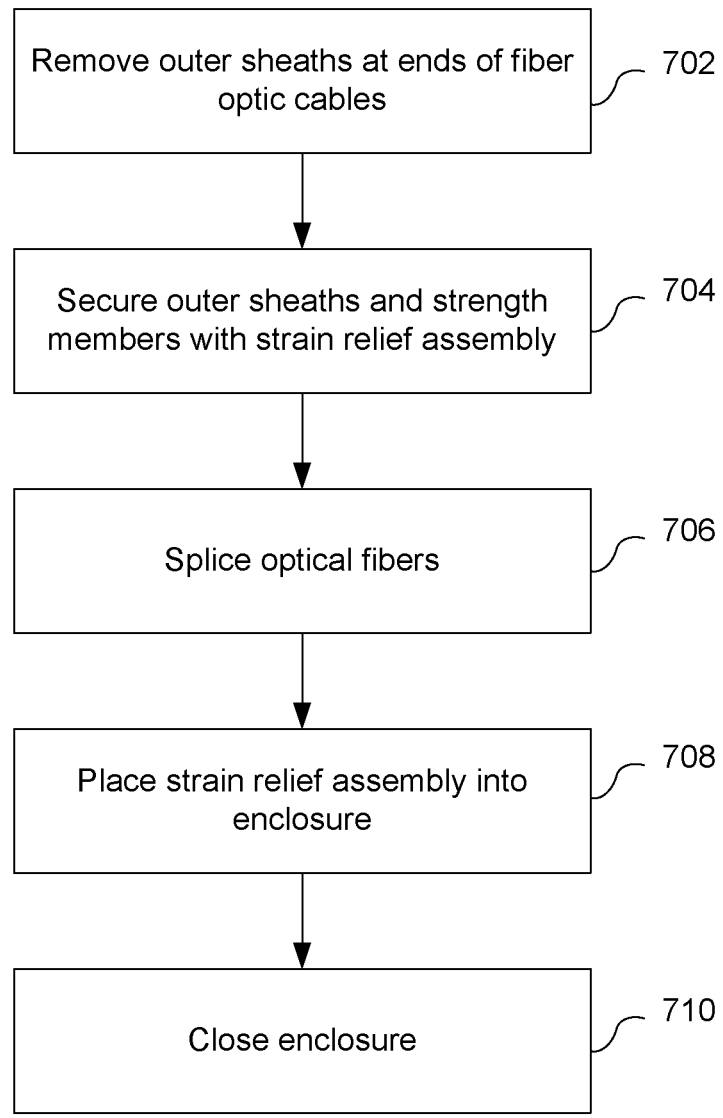
FIG. 7 shows a method of joining fiber optic cables in the optical fiber splice closure.

FIG. 7 shows a method 700 of joining fiber optic cables in the optical fiber splice closure 100. Reference is also made concurrently to FIGS. 8A-8F, which show examples of fiber optic cable at different stages of the method of joining fiber optic cables in the optical fiber splice closure.

Figure 8A:
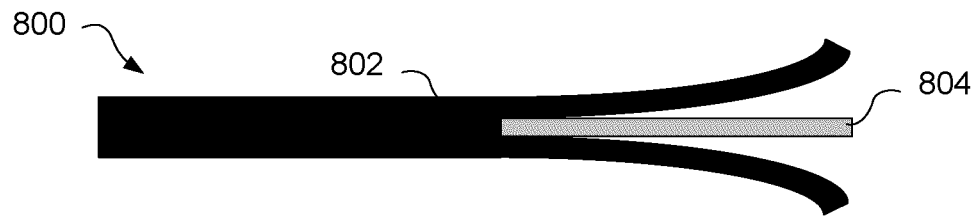
FIGS. 8A-8F show examples of fiber optic cable at different stages of the method of joining fiber optic cables in the optical fiber splice closure.
Figure 8B:
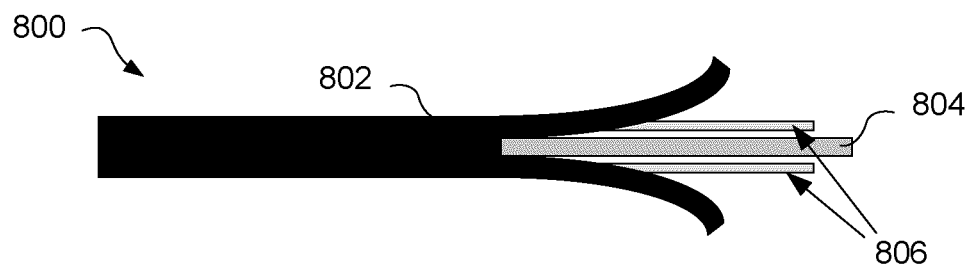
Figure 8C:
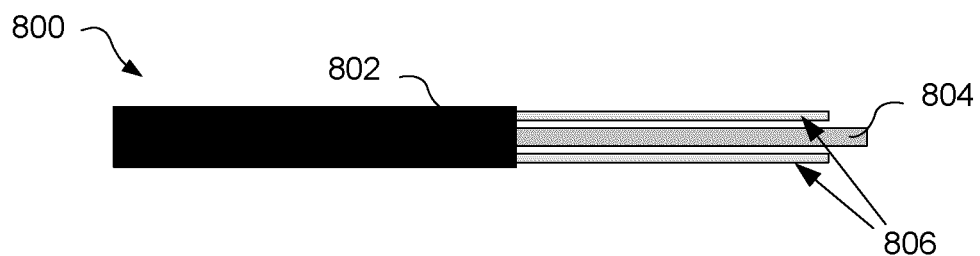
Figure 8D:
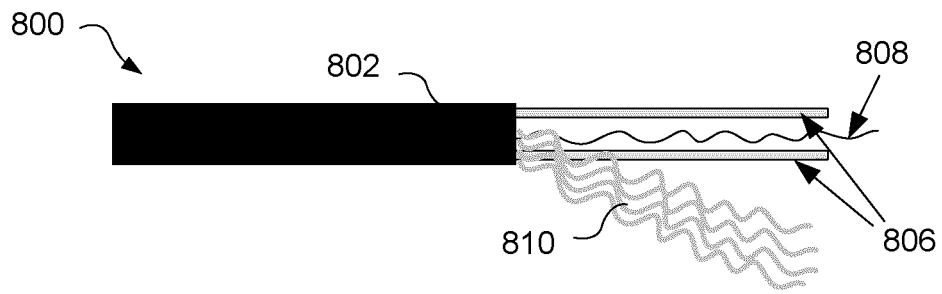

In the method 700, the outer sheaths at ends of the fiber optic cables to be connected are removed to expose the respective strength members and optical fibers (702). As shown for example in FIG. 8A, outer sheath 802 of fiber optic cable 800 is cut/peeled to expose a subunit 804 of an example fiber optic cable 800. In FIG. 8B, strengthening rods 806 are removed from the portions of the outer sheath 802 that has been peeled. In FIG. 8C, the outer sheath 802 is cut to remove the peeled portions therefrom. In FIG. 8D, optical fiber 808 is exposed by opening the subunit 804, which further exposes strengthening fibers 810. The amount of outer sheath removed is sufficient to allow for splicing of the optical fibers, and may for example be between 10 to 12 inches in length (i.e. resulting in 10 to 12 inches of optical fiber 808). Care must be taken to avoid any damage to the subunit/optical fiber when removing the outer sheath. As has also been previously described, fiber optic cables may have various internal configurations and there may, for example, be no subunit 804 (e.g. just optical fiber surrounded by strengthening fibers, or optical fiber disposed directly in the sheathing), and/or no strengthening rods 806. The fiber optic cable 800 is shown just as an example only and the method 700 is not limited to this example.

Figure 8E:
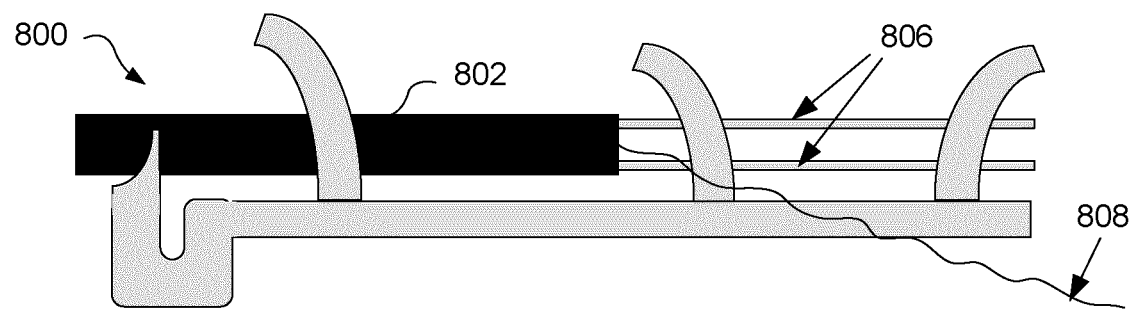
Figure 8F:
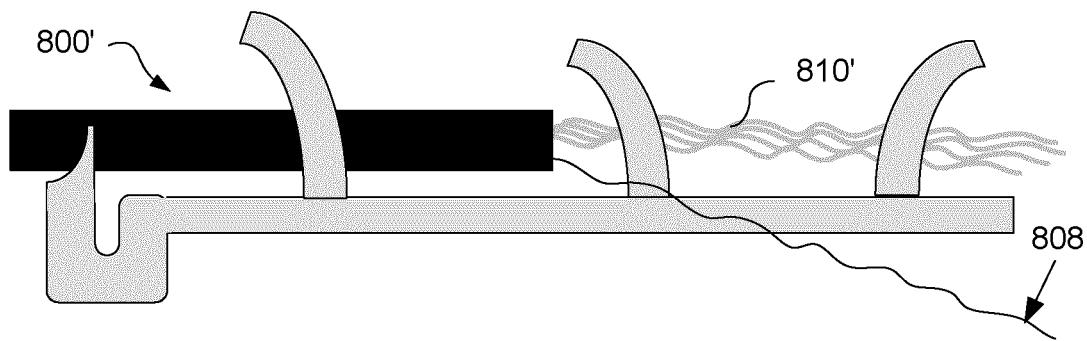

The outer sheaths and the strength members of the fiber optic cables are secured with respective securing members of the strain relief assembly (704), for example by folding or crimping the securing members over the outer sheath/strength members. The outer securing members may first be folded or crimped to secure the outer sheaths of the first and second fiber optic cables. The outer sheath may extend just past the outer securing member, for example by approximately ¼ inches. The strength member(s) may be aligned along the bracket of the strain relief assembly, secured by folding or crimping the at least one inner securing member, and cut to size to avoid any excess length of strength member inside the enclosure. The strength member(s) may extend just past the inner securing members, for example by approximately ⅛ inches. As previously described, if there are multiple inner securing members, the strength member(s) of a given fiber optic cable may be secured by each of the inner securing members. FIGS. 8E and 8F show an example of a fiber optic cable being secured by the strain relief assembly, as for example has been previously described with reference to FIG. 3. As only one fiber optic cable is shown in FIGS. 8E and 8F for the sake of explanation, only a portion of the strain relief assembly is shown.

As shown in FIG. 8E, strengthening rods 806 are secured by two inner securing members and cut to size. If strengthening fibers are present, these may also be secured by the inner securing members and cut to size (not shown in FIG. 8E). Alternatively, the fiber optic cable 800 may be sufficiently secured by securing just the strengthening rods 806, and the strengthening fibers (e.g. strengthening fibers 810 in FIG. 8D) may be cut back to the end of the outer sheath 802 and not used for securing the fiber optic cable in the strain relief assembly. Where a fiber optic cable 800' having a different internal configuration with no strengthening rods and just strengthening fibers 810' is being used, the strengthening fibers 810' are secured by the inner securing members and cut to size as shown in FIG. 8F.

The optical fibers of the fiber optic drop cables are spliced (706). The optical fibers may be fused or mechanically connected. Where the optical fibers are fused, heatshrink may be placed over the splice. The strain relief assembly is placed into the enclosure (708). The enclosure may be filled with flooding compound to prevent water ingress and protect the splice, particularly where the optical fiber splice closure is to be used in outdoor applications or in applications where there is concern of water ingress. Excess length of optical fiber may be coiled and secured in the enclosure, for example by setting in the flooding compound. In this regard, the optical fiber should be a bend-insensitive fiber if it is being coiled/curved. The enclosure is securely closed (710).

FIG. 9 shows an example representation of optical fiber splice closures installed in the field. As described previously, the optical fiber splice closure disclosed herein facilitates use of bulk fiber drop for FTTH installations and allows installers to move away from pre-connecterized drop. Installers can use any kind of pig-tail connectors to join one end of the fiber optic drop cable to a terminal box, while the other end of the fiber optic drop cable extends to a customer premise (e.g. customer's home, apartment building, etc.) and is joined with the customer's cable, for example via a field mountable connector. The optical fiber splice closure as disclosed herein thus allows a single length of fiber optic drop cable to run from the terminal to the customer premise, and encloses the spliced fiber optic cable at each of the joining locations. Due to its compact size, the optical fiber splice closure may be easily buried underground or if left above-ground, is hardly noticeable.

In FIG. 9, fiber optic drop cable 902 is supplied to a geographic area by a telecommunications service provider from a distribution hub, for example. The drop cable 902 may be spliced to various different types of terminals, such as an aerial-type terminal 904, a pedestal-type terminal 906, and a grade-level box terminal 908. Each of the terminals 904, 906, and 908 comprise various ports that provide for individual connection to a pig-tail connector. A pig-tail connector 910*a* labeled in FIG. 9 is shown as connecting to the aerial-type terminal 904. Fiber optic drop cable extending between the terminal and the customer's premise can connect to the customer's equipment at customer premise at one end, and can be joined to the pig-tail connector at the terminal at the other end via the optical fiber splice closure as disclosed herein. A length of fiber optic drop cable 914*a* is labeled in FIG. 9 as extending to a customer's house 916*a* at one end and being connected to the pig-tail connector 910*a* via optical fiber splice closure 912*a* at the other end. As shown in FIG. 9, drop cable between a plurality of customer's premises and terminals can be installed in a similar manner.

As has been previously described, being able to join the fiber optic drop cable extending to the customer's premise with any type of pig-tail connector connected with the terminal using the optical fiber splice closure as disclosed herein allows for moving away from pre-terminated drop cables and thus pre-defined lengths of drop cables. Fiber optic drop cables can be provided on a reel, cut to size, and appropriately joined with the pig-tail connector and secured inside the optical fiber splice closure. Also, since the optical fiber splice closure is compact, it is hardly noticeable if left above ground for viewing, and can easily be buried underground.

As also evident from the present disclosure, the optical fiber splice closure can be used in many other instances of joining fiber optic cable. For example, the optical fiber splice closure may be used for connecting two lengths of fiber optic drop cable upon installation and/or repair, as shown in FIG. 9 with optical fiber splice closure 920. More generally, the optical fiber splice closure may be used for joining any two lengths of fiber optic cable for various purposes, including inside buildings, etc.

The optical fiber splice closure including the strain relief assembly and enclosure may also be provided as a kit. The kit may include various other components for joining and/or installation of the fiber optic cables, such as a pig-tail connector for connecting to the terminal, a flooding compound, etc.

Figure 10:
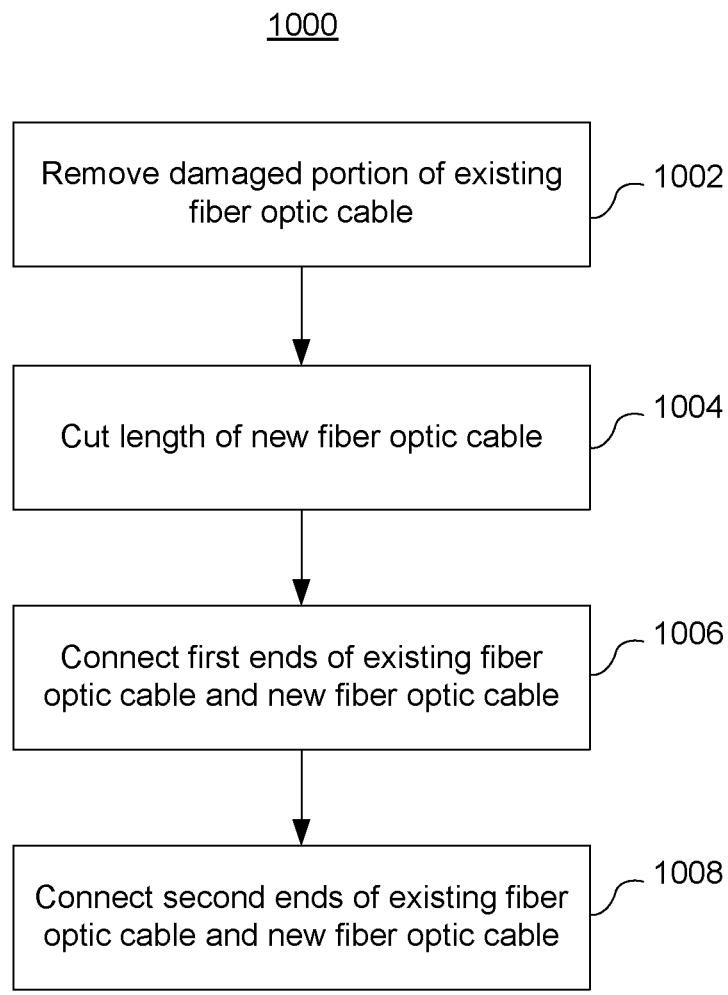
FIG. 10 shows a method of repairing fiber optic cable.

FIG. 10 shows a method 1000 of repairing fiber optic cable. Fiber optic cable may become damaged for various reasons. For example, if fiber optic drop cable is buried underground to a customer's house, a resident or worker digging into the ground may accidentally damage the cable. Because the optical fiber splice closure as disclosed herein is compact and permits fusing of optical fibers, a strong connection can be provided by the optical fiber splice closure at several locations between the terminal and the premise. Accordingly, a damaged cable can be easily repaired without diminishing the integrity of the overall connection; and further, the newly installed optical fiber splice closures can be easily buried underground, or if installed above-ground, their compact size is not as noticeable.

In the repair method 1000, the existing fiber optic cable is cut to remove a length of damaged portion (1002). Cutting the existing fiber optic cable exposes first and second end portions. A length of new fiber optic cable is cut based on the length of the damaged portion of the existing fiber optic cable that was removed (1004). When bulk fiber optic drop cable is used, the length of the new cable can be readily cut without producing excess waste. The length of new fiber optic cable will be cut slightly larger than the length of the damaged portion of the existing fiber optic drop cable in order to provide excess length for performing the splicing. The length of new fiber optic cable has first and second exposed end portions.

The first exposed end portions of the existing fiber optic cable and the new fiber optic cable are connected using a first optical fiber splice closure (1006). The second exposed end portions of the existing fiber optic cable and the new fiber optic cable are connected using a second optical fiber splice closure (1008). The method for joining the ends of the existing fiber optic cable and the new fiber optic cable in the optical fiber splice closure may comprise the method 700.

It would be appreciated by one of ordinary skill in the art that the system and components shown in the figures may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein. As one example, while the foregoing description has described fiber optic cables having a single optical fiber, it would be readily appreciated by a person skilled in the art that fiber optic cables with multiple optical fibers (e.g. two, six, etc., optical fibers) could be joined in the fiber optic splice closure in accordance with the present disclosure.

The invention claimed is:

1. A strain relief assembly for securing first and second fiber optic cables, each fiber optic cable comprising an optical fiber, a strength member, and an outer sheath enclosing the optical fiber and the strength member, the strain relief assembly comprising:
   a bracket;
   a first outer pliable tab coupled with the bracket for securing and locking in position the outer sheath of the first fiber optic cable;
   a second outer pliable tab coupled with the bracket for securing and locking in position the outer sheath of the second fiber optic cable; and
   at least one inner pliable tab coupled with the bracket for securing and locking in position the strength members of the first and second fiber optic cables along lengths thereof where the outer sheaths have been removed;
   wherein the at least one inner pliable tab is arranged closer to a center along a longitudinal length of the bracket than the first and second outer pliable tabs.

2. The strain relief assembly of claim 1, wherein the at least one inner pliable tab comprises first and second inner pliable tabs along the longitudinal length of the bracket.

3. The strain relief assembly of claim 1, wherein one or more of the outer and inner pliable tabs comprises a pair of pliable tabs.

4. The strain relief assembly of claim 1, wherein one or more of the outer and inner pliable tabs are configured to be folded or crimped to secure the respective outer sheath or strength members.

5. The strain relief assembly of claim 1, wherein the bracket further comprises first and second support members for supporting the first and second fiber optic cables.

6. The strain relief assembly of claim 5, wherein the bracket comprises a depression between the respective first and second support members and a length of the bracket along which the pliable tabs are arranged, and wherein the depression has a bottom surface that is disposed lower than the length of the bracket along which the pliable tabs are arranged when viewed from the side.

7. The strain relief assembly of claim 1, wherein the bracket further comprises a ridge for securing the strength members in conjunction with the at least one inner pliable tab.

8. The strain relief assembly of claim 7, wherein the ridge is formed from a ridge-forming member coupled with the bracket.

9. The strain relief assembly of claim 7, wherein the ridge is disposed at the center of the bracket.

10. The strain relief assembly of claim 7, wherein the at least one inner pliable tab comprises first and second inner pliable tabs disposed at respective sides of the ridge.

11. The strain relief assembly of claim 1, wherein the bracket is made of metal.

12. The strain relief assembly of claim 1, wherein the strength member of at least one of the first and second fiber optic cables comprises a strengthening rod.

13. The strain relief assembly of claim 1, wherein the strength member of at least one of the first and second fiber optic cables comprises a strengthening fiber.

14. The strain relief assembly of claim 1, wherein at least one of the first and second fiber optic cables comprise a plurality of strength members.

15. The strain relief assembly of claim 14, wherein the plurality of strength members comprise two or more strengthening rods.

16. The strain relief assembly of claim 14, wherein the plurality of strength members comprise a strengthening fiber and at least one strengthening rod.

17. An optical fiber splice closure for joining first and second fiber optic cables, each fiber optic cable comprising an optical fiber, a strength member, and an outer sheath enclosing the optical fiber and the strength member, the optical fiber splice closure comprising:
  an enclosure having a base portion and a top portion connectable with each other, the base portion and the top portion when connected configured to define first and second openings for first and second fiber optic cables, respectively; and
  a strain relief assembly disposed inside of the enclosure, comprising:
    a bracket;
    a first outer pliable tab coupled with the bracket for securing and locking in position the outer sheath of the first fiber optic cable;
    a second outer pliable tab coupled with the bracket for securing and locking in position the outer sheath of the second fiber optic cable; and
    at least one inner pliable tab coupled with the bracket for securing and locking in position the strength members of the first and second fiber optic cables along lengths thereof where the outer sheaths have been removed;
  wherein the at least one inner pliable tab is arranged closer to a center along a longitudinal length of the bracket than the first and second outer pliable tabs.

18. The optical fiber splice closure of claim 17, wherein the at least one inner pliable tab comprises first and second inner pliable tabs along the longitudinal length of the bracket.

19. The optical fiber splice closure of claim 17, wherein one or more of the pliable tabs comprises a pair of outer and inner pliable tabs.

20. The optical fiber splice closure of claim 17, wherein one or more of the outer and inner pliable tabs are configured to be folded or crimped to secure the respective outer sheath or strength member.

21. The optical fiber splice closure of claim 17, wherein the bracket further comprises first and second support members for supporting the first and second fiber optic cables.

22. The optical fiber splice closure of claim 21, wherein the bracket comprises a depression between respective first and second support members and a length of the bracket along which the pliable tabs are arranged, and wherein the depression has a bottom surface that is disposed lower than the length of the bracket along which the pliable tabs are arranged when viewed from the side.

23. The optical fiber splice closure of claim 17, wherein the bracket further comprises a ridge for securing the strength members in conjunction with the at least one inner pliable tab.

24. The optical fiber splice closure of claim 23, wherein the ridge is formed from a ridge-forming member coupled with the bracket.

25. The optical fiber splice closure of claim 23, wherein the ridge is disposed at the center of the bracket.

26. The optical fiber splice closure of claim 23, wherein the at least one inner pliable tab comprises first and second inner pliable tabs disposed at respective sides of the ridge.

27. The optical fiber splice closure of claim 17, wherein the strength member of at least one of the first and second fiber optic cables comprises a strengthening rod.

28. The optical fiber splice closure of claim 17, wherein the strength member of at least one of the first and second fiber optic cables comprises a strengthening fiber.

29. The optical fiber splice closure of claim 17, wherein at least one of the first and second fiber optic cables comprise a plurality of strength members.

30. The optical fiber splice closure of claim 29, wherein the plurality of strength members comprise two or more strengthening rods.

31. The optical fiber splice closure of claim 29, wherein the plurality of strength members comprise a strengthening fiber and at least one strengthening rod.

32. The optical fiber splice closure of claim 17, wherein the enclosure comprises a flooding compound disposed in an interior thereof.

33. The optical fiber splice closure of claim 17, wherein the strain relief assembly is made of metal.

34. The optical fiber splice closure of claim 17, wherein the top and bottom portions of the enclosure are made of LDPE or MDPE UV protected plastic.

35. An optical fiber splice closure kit, comprising:
  the strain relief assembly of claim 1; and
  an enclosure having a base portion and a top portion connectable with each other, the base portion and the top portion when connected configured to define first and second openings for first and second fiber optic cables, respectively.

36. The optical fiber splice closure kit of claim 35, further comprising:
  a flooding compound.

37. The optical fiber splice closure kit of claim 35, further comprising:
  a pigtail connector for connection with a terminal box.

* * * * *